July 24, 1934.  A. JUNG  1,967,532
MOUSE AND ANIMAL TRAP
Filed June 9, 1933
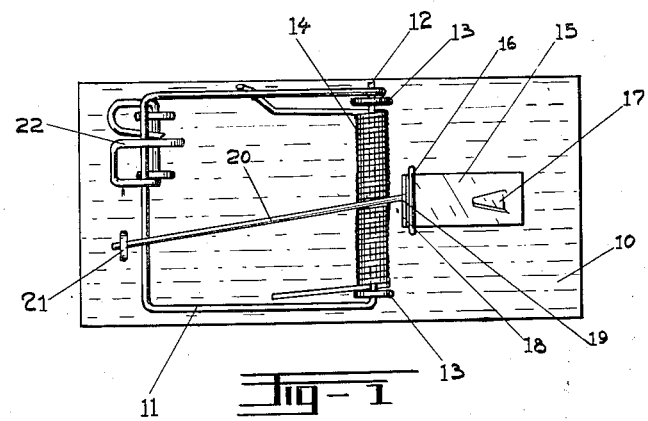
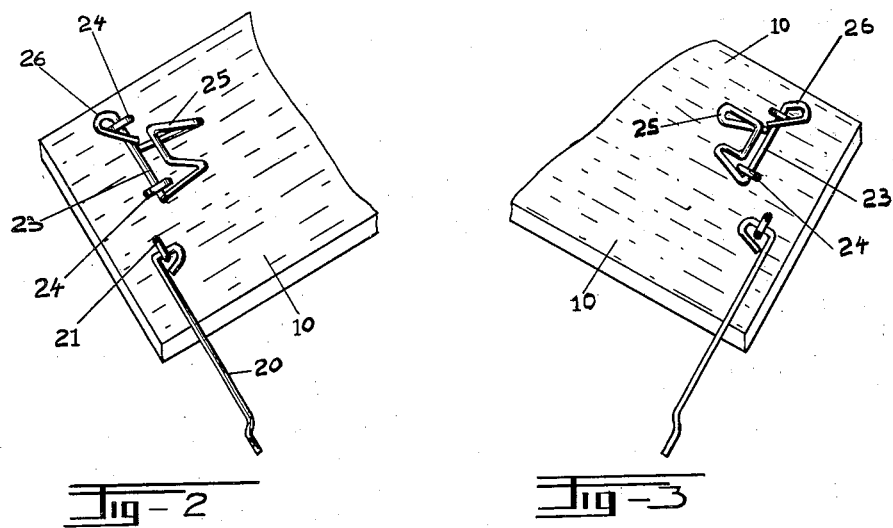
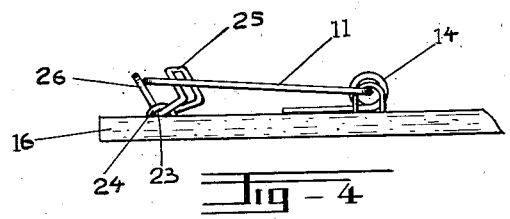
INVENTOR
Anton Jung
BY
ATTORNEY Patented July 24, 1934

1,967,532

UNITED STATES PATENT OFFICE 1,967,532

MOUSE AND ANIMAL TRAP

Anton Jung, New York, N. Y.

Application June 9, 1933, Serial No. 675,045

2 Claims. (Cl. 43—97)

This invention relates to new and useful improvements in mouse traps, and has for its object to provide a mouse trap that will prove greatly superior in efficiency to any of those now commonly known.

Thus this present application embodies further improvements of my invention, for which I have filed applications for patents, February 13 and May 9, 1933, under Serial Nos. 656,436 and 670,079, respectively.

One of the outstanding characteristics of the present device is that this mouse trap may be set with an infinitely small degree of resistance to "going off"; or in other words, the said mouse trap may be said to possess a high degree of "catchability".

Another advantage lies in the fact that the present device, or trap, may actually be set or cocked in what may be termed an "automatic manner", or with no effort at all.

A still further advantage resides in the fact that the said trap may on account of the special protective means associated therewith, as will be hereinafter more fully described, be handled, or operated with ease and in a secure manner, even by nervously disposed women.

It will appear obvious that a trap of this kind may be used to catch not only mice and rats, but also other and larger animals.

As the device is comparatively simple of construction, and consequently may be manufactured at a very small cost, it is thought that this invention, especially in view of the unique features embodied therein, should have great market possibilities.

With the above and other objects in view, this invention consists of the novel features of construction, combination and arrangement of parts, hereinafter fully described, claimed and illustrated in the accompanying drawing forming part of this specification, and in which similar characters of reference indicate corresponding parts in all views, and in which:

Figure 1 is a perspective top plan view of my invention.

Figures 2 and 3 are detail top plan views, while

Figure 4 is a detail side elevational view, showing the essential part and new feature of my invention, and illustrating the specific manner in which it is made to operate.

Referring more particularly to the drawing, 10 indicates the base of a mouse trap, to which is attached the rectangular frame, or member 11, that catches the mouse or other animal desired; the said frame is of a rectangular shape, having a cross bar 12, which is secured by loops 13 to the base 10, while a coiled spring 14 wound around the bar 12 brings the said rectangular frame under tension.

A bait-plate 15 is arranged in front of the frame 11; the said bait-plate consists of a piece of thin metal bent upon itself to form a seat or depression for a retaining member 16; the said plate is made with a hook or spear-point 17 for receiving the bait, and has a rectangularly formed bent endpiece 18 provided with a hole 19 therein, for engagement with the trigger 20. The said trigger consists of a long thin rod adapted to hold the frame member 11 in cocked position, as shown in Figure 1, when the trap is set by engagement of the said rod to the bait-plate 15; the said trigger 20 is in turn secured to the base 10 by a loop 21.

In order to securely arrest the frame 11, while the trap is being set, a member 22, suitable for left and right hand operation, is pivotally connected to the base 10, as shown. The said member 22 consists of one piece of substantially strong wire bent upon itself to form the following parts, or sections: an axis 23, which is turnable in the loops 24, 24, a hook-portion 25, for arresting the frame when in cocked position, and a lever 26, which, when the frame 11 is turned backward, or is to be cocked, will be tripped by said frame striking the lever, whereupon the hook-portion 25 simultaneously will ascend, or rise to catch and securely hold the said frame 11, pending the adjustment of the trigger 20 to the bait-plate 15. When such adjustment has been made, the hook-portion 25 is automatically released from its hold upon the frame 11; and the trap will thus be set and in position for operation.

It is obvious that changes may be made in the form, construction and arrangement of the several parts, as shown, within the scope of the appended claims, without departing from the spirit of the invention, and I do not therefore wish to limit myself to the construction and arrangement shown and described herein.

What I claim, as new and desire to secure by Letters Patent of the United States, is:—

1. In a device of the class described, a mouse trap, comprising a base, a spring-tensioned mouse-catching frame secured to the latter, a trigger co-operating with the said frame, a bait-plate pivotally attached to the base, and means for arresting and releasing the said spring-tensioned frame during adjustment of the trigger to the bait-plate, said means consisting of a single wire bent upon itself to form, in one piece, an axis, a substantially right angular hook-member bent thereon, and a rearwardly extending thumb-piece bent at a right angle to said hook-member, the hook-member by its weight normally placing said arresting and releasing means in a forward, or released position with the thumb-piece somewhat raised and thereby adapted to be tripped by the mouse-catching frame in cocking the latter, said hook-member simultaneously raising, and automatically engaging the said frame during adjustment of the trigger to the bait-plate.

2. In a device of the class described, an animal trap, suitable for left and right hand operation, and comprising a base, a spring-tensioned animal-catching frame secured to the latter, a trigger pivotally attached to the base and being adapted to engage said frame, a bait-plate pivotally attached to the base and adapted to engage the said trigger, and a wire-member bent upon itself to form, in one unit, an axis, a substantially right angular hook-member bent thereon, and a rearwardly extending thumb-piece bent at a right angle to said hook-member, said hook-member by its weight normally disposing said arresting and releasing means in a forward, or released position, supported by the base, with the thumb-piece somewhat raised and adapted to be tripped by the mouse-catching frame in cocking the latter, thereby simultaneously and automatically raising said hook-member for engagement with the frame during adjustment of the trigger to the bait-plate, substantially as and for the purpose set forth.

ANTON JUNG.